Feb. 5, 1957  C. W. KANDLE  2,780,439
EARTH BORING DRILLS
Filed Sept. 20, 1954
FIG. I.
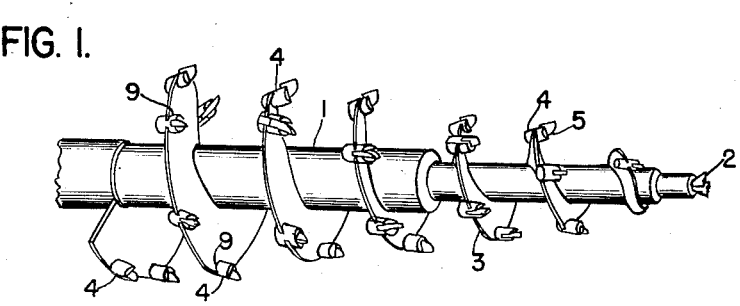
FIG. 2.
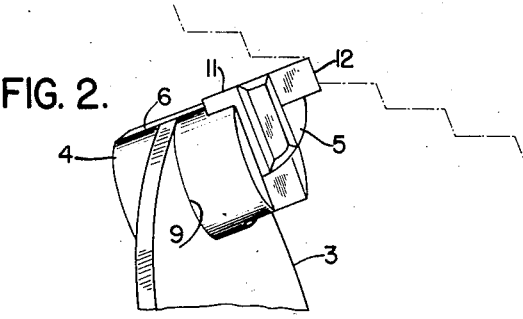
FIG. 3.
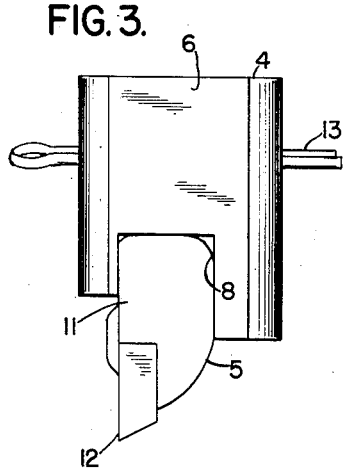
FIG. 4.
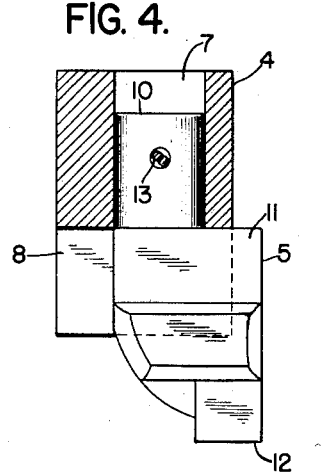
*INVENTOR.*
CHARLES W. KANDLE
BY *Andrus & Sieden*
Attorneys

_2,780,439_

EARTH BORING DRILLS

Charles William Kandle, Chicago, Ill.

Application September 20, 1954, Serial No. 457,027

5 Claims. (Cl. 255—69)

This invention relates to earth boring drills.

According to the invention, a drill having a tapered spiral screw flight is provided with a plurality of peripherally spaced socket members for individually carrying a removably secured cutting bit at a desired angle to the cutting surface for boring through hard rock materials encountered in earth boring operations.

More specifically the invention provides an earth boring drill having a tapered shaft with the relatively smaller diameter at the forward end of the drill. The shaft carries a correspondingly tapered spiral screw flight. A plurality of socket members are fixedly secured in spaced relation in the outer periphery of the spiral screw flight for individually supporting a removable cutting member. Each socket member is provided with a circular socket opening and a slot extending across the forward face of the member. Each corresponding cutting member is comprised of a circular shank which extends into the opening of the socket member and a body portion for carrying a cutting bit offset from the axis of the shank which seats in the slot of the socket member and secures the cutting member against rotation. Pin means extending through the socket member and shank of the cutting member removably secure the members together.

The drawings furnished herewith illustrate the best mode of carrying out the invention as presently contemplated and set forth hereinafter.

In the drawings:

Figure 1 is a perspective view of the earth boring drill of the invention showing the cutter elements spaced on the tapered spiral screw flight;

Fig. 2 is an enlarged perspective view showing a cutting element in its socket secured to the screw flight and with the contour of the hole formed by the drill indicated by a dotted line;

Fig. 3 is an end elevation of a cutting element removably secured in its socket; and Fig. 4 is a side elevation partially in section showing the cutting element in its socket.

In carrying out the invention an earth boring drill adapted to be driven rotatably is provided with a tapered shaft 1 having a relatively smaller diameter at the forward or penetrating end thereof and carries the cutting tip 2 forwardly thereof. The shaft 1 is provided with the correspondingly tapered spiral screw flight 3 to form an earth moving conveyor. The spiral screw flight 3 carries a plurality of spaced angularly disposed socket members 4 in the outer periphery therefor for individually receiving and removable cutting members 5.

According to the invention, each socket member 4 is generally cylindrical and is provided with a flat chordal surface 6 and a circular socket opening 7 extending axially therethrough. A slot 8 is provided across the forward face of each socket member 4 generally normal to the chordal surface 6 of the member.

A plurality of spaced generally circular cavities 9 are provided in the outer periphery of the screw flight 3 over the length thereof for individually receiving socket members 4. Each socket member 4 extends axially through the screw flight 3 and is disposed at an angle and welded within the cavity with the chordal surface 6 facing outwardly of the drill and flush with the outer periphery of the screw flight 3. The angle of the socket member welded in place is such that the slotted or forward end facing in the direction of the drilling extends outwardly respecting the periphery of the drill.

The cutting member 5 is received forwardly by each socket member 4 and is removably secured therein. Each cutting member 5 is comprised of a rearwardly extending shank 10 which is received in the socket opening 7 of a corresponding member 4. The body portion 11 of each cutting member 5 extends forwardly from the respective shank 10 and is formed integrally with the shank and received within slot 8 of the socket member to secure the cutting member against rotation. The cutting bit 12 is carried forwardly by body portion 11 and is secured therein as by brazing and is offset from the axis of shank 10. The cutting edge of bit 12 is parallel to slot 8 so as to be angularly disposed with respect to chordal surface 6 and extends outwardly beyond surface 6.

Each cutting member 5 is secured within the respective socket member 4 by means of a cotter pin 13 extending through transversely aligned holes provided in each corresponding socket member and shank 10, to permit removal of each member for sharpening and replacement.

The arrangement of cutting member 5 within socket members 4 and their combined arrangement within screw flight 3 provides the cutting bit 12 with the desired cutting angle. The axis of each socket member 4 extends forwardly outward so that when drilling vertically the cutting edge of bit 12 secured therein is disposed at any inwardly sloping angle with respect to a horizontal plane. Each bit 12 therefore cuts an angularly disposed ledge, the inner edge of which is closer to the bottom of the crater being cut than is the outer edge. The axis of socket member 4 is also angularly disposed with respect to shaft 1 to provide the cutting blade with a positive front rake. As the cut material is lifted by the leading face of bit 12 the angularity of the bit with respect to chordal surface 6 flush with the outer periphery of screw flight 2 provides a side rake angle for carrying the cut material inwardly onto the earth moving screw flight.

The invention provides a spiral drill capable of cutting through hard materials such as sandstones and shales. Rock formations encountered in drilling operations are frequently characterized by undefined differences in density over short distances. With cutting heads spaced axially over the length of the screw flight and therefore through one or more density variations of such materials an average number of different cutters are always in harder or softer rock portions. This averages the cutting resistance encountered to correspond with the maximum speed of drill rotation and pressure applied to advance the drill. The rugged construction and readily replaceable drill bit insures that machine down-time for the drill of this invention will be kept to an absolute minimum.

Various modes of carrying out the invention are contemplated as within the scope of the following claims particularly pointing out and distinctly claiming the subject matter which is regarded as the invention.

I claim:

1. In an earth boring drill, a shaft, a tapered spiral screw flight carried by the shaft and extending from the forward end thereof with the relatively smaller diameter disposed forwardly, a plurality of socket members fixedly secured in spaced relation in the outer periphery of the screw flight, each socket member being provided with a socket opening forwardly, a plurality of cutting members each having a shank portion and a cutting bit offset from the axis of the shank, the shank of each cutting member fitting within a socket opening and being secured against rotation within the socket member, each cutting bit extending beyond the outer adjacent edge of the screw flight and angularly with respect to the shaft with a positive front rake, and means to removably secure the shank of each cutting member within the socket opening to secure the same in operative relation and allow replacement of the cutting member.

2. In an earth drill for hard rock, shale and the like, a shaft having a tapered screw flight extending from the forward end of the shaft, said flight having a spirally formed outer edge with the relatively smaller diameter at the forward end of the drill, a series of socket members fixed within notches formed in the outer margin of said flight, each member having a circular socket hole extending therethrough and abutment means on the forward face of the member, a series of cutters individually having a circular shank and a cutting tooth offset from the axis of said shank, the shank of each cutter fitting within the socket hole of a corresponding socket member with the cutter secured against rotation by the abutment means, each cutter tooth extending beyond the radial dimensions of the adjacent edge of the drill flight and angularly with respect to the drill shaft with a positive front rake, and a removable pin extending through corresponding holes in said member and cutter shank to secure the same in assembled operative relation and allow replacement and sharpening of the cutter.

3. In an earth boring drill, a shaft, a tapered spiral screw flight carried by the shaft and extending from the forward end thereof with the relatively smaller diameter disposed forwardly, a plurality of socket members fixedly secured in spaced relation in the outer periphery of the screw flight, each socket member being provided with a circular socket opening therethrough and a slot extending across the forward face of the member, a plurality of cutter members each having a circular shank and a cutting tooth offset from the axis of said shank, the shank of each cutter member fitting within the socket opening of a corresponding socket member with the cutter member partially disposed within said slot so as to be secured against rotation, each cutting tooth extending beyond the outer adjacent edge of the screw flight and the socket member holding the same and angularly with respect to the shaft with a positive front rake, and removable pin means extending through aligned holes in said members to secure the same in operative relation and allow replacement of the cutter member.

4. In an earth boring drill, a shaft, a tapered spiral screw flight forming an earth moving conveyor carried by the shaft and extending from the forward end thereof with the relatively smaller diameter disposed forwardly, a plurality of generally cylindrical socket members each having an outwardly disposed chordal surface and a circular socket opening therethrough and a slot extending across the forward face of the member angularly to the chordal surface, said socket members being welded within notches provided in spaced relation in the screw flight with the chordal surfaces disposed angularly flush with the outer periphery thereof, a plurality of cutter members each having a circular shank and a cutting bit offset from the axis of said shank, the shank of each cutter member fitting within the socket opening of a corresponding socket member with the cutter member partially disposed within said slot so as to be secured against rotation, each cutting bit extending parallel to the slot and each bit being disposed angularly to the chordal surface to provide a side rake to carry the loosened material inwardly to the earth moving conveyor, each bit extending outwardly beyond the chordal surface and angularly with respect to the shaft to provide a positive front rake, and a removable pin extending through aligned holes in said member to secure the same in operative relation and allow replacement of the cutter member.

5. In an earth boring drill, a shaft, a tapered spiral screw flight forming an earth moving conveyor carried by the shaft and extending from the forward end thereof with the relatively smaller diameter disposed forwardly, a plurality of generally cylindrical socket members each having an outwardly disposed chordal surface and a circular socket opening therethrough and a slot extending across the forward face of the member angularly to the chordal surface, said socket members being secured as by welding to the flight within the notches provided in spaced relation in the flight and with the chordal surfaces disposed angularly with respect to the shaft and flush with the outer periphery of the screw flight, a plurality of cutter members each having a circular shank and a cutting edge normal to the shank and offset from the axis of said shank, the shank of each cutter member fitting within the socket opening of a corresponding socket member with the cutter member partially disposed within said slot so as to be secured against rotation, each cutting edge being angularly disposed by the respective socket member to cut a conical edge, each cutting edge being disposed parallel to the slot and angularly to the chordal surface of the socket members to provide a side rake to carry the loosened material inwardly to the earth moving conveyor, and each cutting edge extending outwardly beyond the chordal surface and angularly with respect to the shaft to provide a positive front rake, and a removable pin extending through aligned holes in said members to secure the same in operative relation and allow replacement of the cutter member.

References Cited in the file of this patent

UNITED STATES PATENTS

| | | |
|---|---|---|
| 1,859,717 | Rutrle | May 24, 1932 |
| 2,594,261 | Henning | Apr. 22, 1952 |

FOREIGN PATENTS

| | | |
|---|---|---|
| 625,362 | Great Britain | June 27, 1949 |